United States Patent [19]

Taylor

[11] Patent Number: 4,630,805
[45] Date of Patent: Dec. 23, 1986

[54] TENSION-COMPRESSION LIQUID SPRING UNIT

[75] Inventor: Paul H. Taylor, Grand Island, N.Y.

[73] Assignee: Tayco Developments, Inc., North Tonawanda, N.Y.

[21] Appl. No.: 250,846

[22] Filed: Apr. 3, 1981

[51] Int. Cl.[4] .............................................. F16F 9/10
[52] U.S. Cl. ........................... 267/64.13; 188/322.11; 188/322.19; 188/322.22; 267/126; 267/136
[58] Field of Search ................... 188/321.11, 322.11, 188/322.16, 322.17, 322.19, 322.22; 267/64.11, 64.13, 124, 126, 136, 138; 92/52, 53, 65, 66; 213/43, 44, 45

[56] References Cited

U.S. PATENT DOCUMENTS

| | | | |
|---|---|---|---|
| 2,944,681 | 7/1960 | Blake | 213/43 |
| 3,028,019 | 4/1962 | Settles et al. | 213/43 X |
| 3,098,644 | 7/1963 | Phillips | 267/126 |
| 3,163,299 | 12/1964 | Settles | 213/43 X |
| 3,173,552 | 3/1965 | Zanow | 213/43 |
| 3,348,703 | 10/1967 | Powell et al. | 213/43 X |
| 3,361,269 | 1/1968 | Peterson | 213/43 X |
| 3,412,869 | 11/1968 | Wallace et al. | 213/43 X |
| 3,554,387 | 1/1971 | Thornhill et al. | 213/43 X |
| 3,752,329 | 8/1973 | Seay et al. | 213/43 X |
| 3,836,013 | 9/1974 | Hawthorne | 213/43 X |
| 3,841,496 | 10/1974 | Hawthorne | 213/43 |
| 3,933,344 | 1/1976 | Taylor | 267/116 X |

FOREIGN PATENT DOCUMENTS 240902  6/1965  Austria ................... 213/43

Primary Examiner—George E. A. Halvosa
Attorney, Agent, or Firm—Joseph P. Gastel

[57] ABSTRACT

A liquid spring unit operable in both tension and compression including a cylinder, compressible liquid in the cylinder, a piston and a seal for the piston, a first sleeve mounted for telescopic movement with respect to the cylinder, a collapsible housing consisting of a second sleeve mounted about the first sleeve and a third sleeve mounted on the second sleeve, a first attachment member mounted relative to the first sleeve for attachment to a first external member, a second attachment member on the third sleeve for attachment to a second external member, a stop for preventing the second and third sleeves from extending beyond a predetermined length when tension forces are applied to the first and second attachment members, a slidable connection between the second and third sleeves for permitting the housing to collapse when compressive forces are applied to the first and second attachment members, and a connection between the piston and the housing for driving the piston into the cylinder when both tension and compression forces are applied to the unit.

16 Claims, 12 Drawing Figures

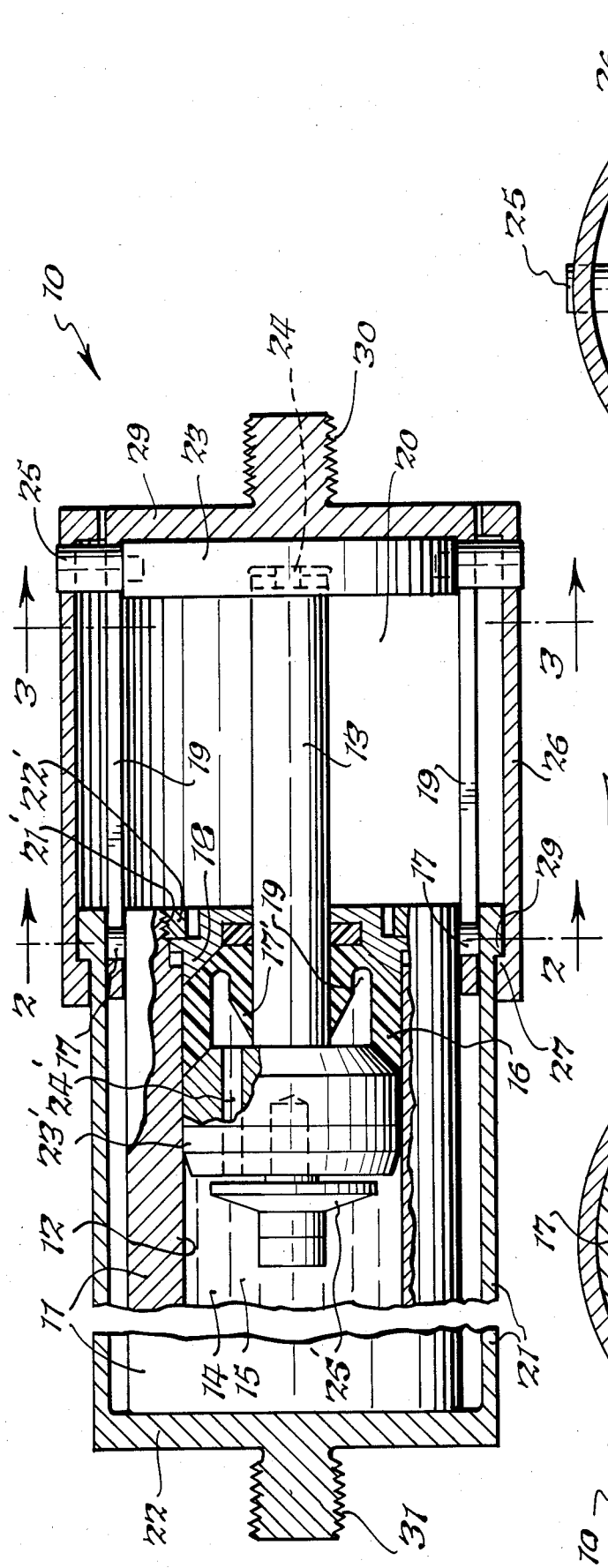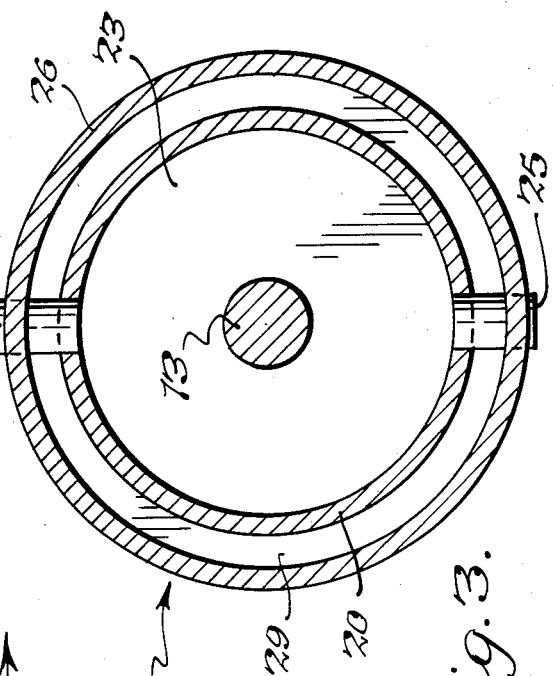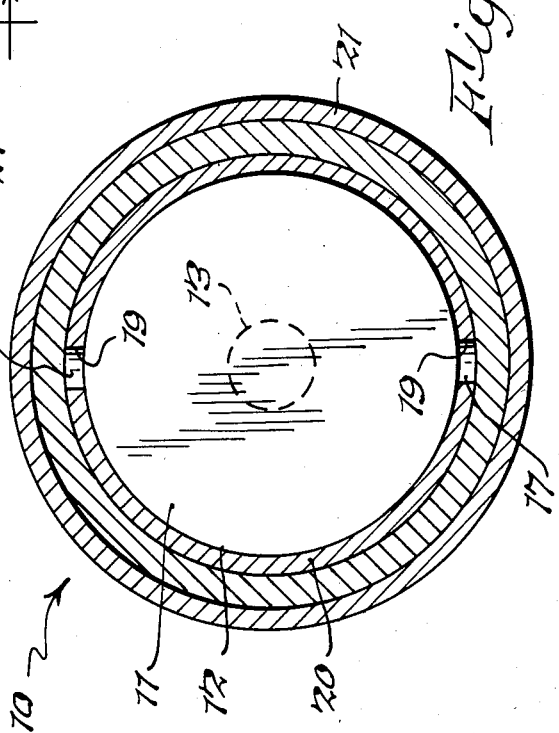

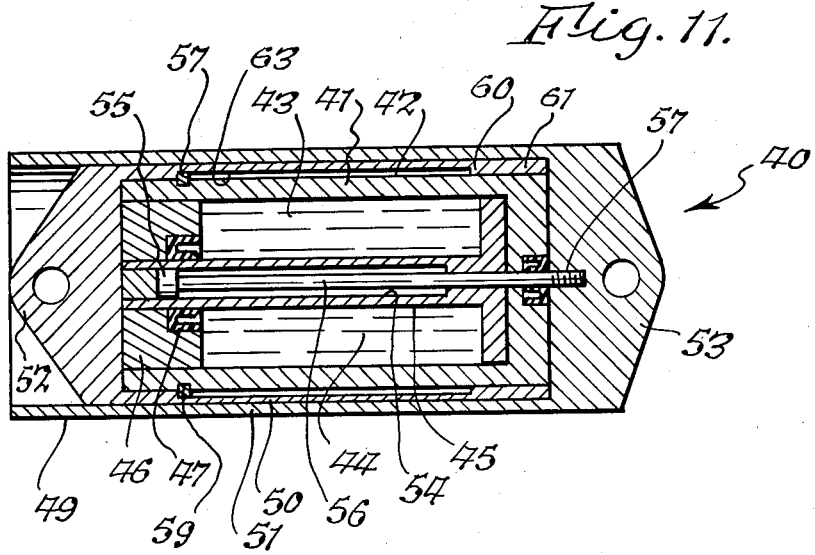
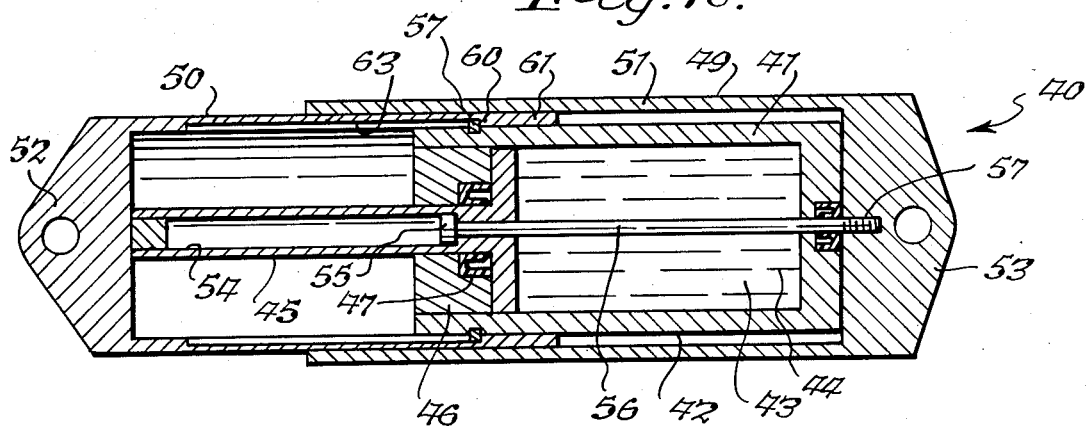
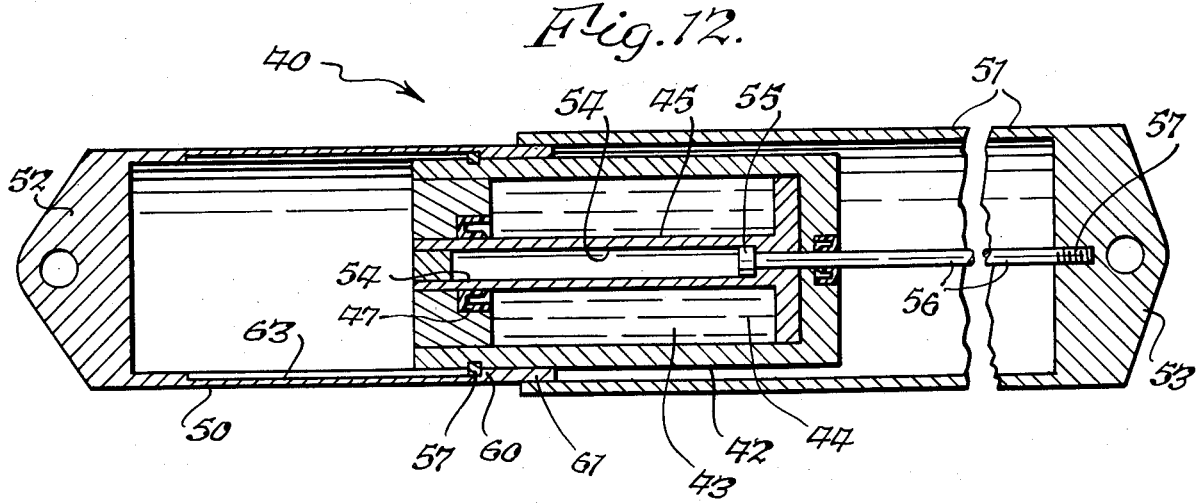

TENSION-COMPRESSION LIQUID SPRING UNIT

CROSS-REFERENCE TO RELATED APPLICATION

The present application is an improvement over the subject matter disclosed in copending patent application Ser. No. 250,845, filed on Apr. 3, 1981.

BACKGROUND OF THE INVENTION

The present invention relates to an improved hydraulic spring unit operable in both tension and compression.

By way of background, hydraulic spring units operable in tension and compression are known. A unit of this type is shown in U.S. Pat. No. 2,842,356, issued July 8, 1958. However, in the past the provision which was made for relative movement of the various parts, as required to provide spring action for both tension and compression, caused the device to be relatively long. This precluded its use in relatively confined spaces.

SUMMARY OF THE INVENTION

It is the object of the present invention to provide an improved liquid spring unit operable in both tension and compression which is so constructed that the required relative movement between the various parts is such that it permits the unit to be relatively short. Other objects and attendant advantages of the present invention will readily be perceived hereafter.

The present invention relates to a liquid spring unit operable in both tension and compression comprising a liquid spring including a cylinder, piston, compressible liquid in said cylinder and a liquid seal for said piston; sleeve means for telescopic mounting relative to said cylinder; a collapsible housing for mounting said cylinder; first attachment means mounted relative to said sleeve means for attachment to a first external member; second attachment means on said housing for attachment to a second external member; means for permitting said housing to collapse when compression forces are applied to said first and second attachment means; and means for preventing said housing from extending beyond a predetermined length when tension forces are applied to said first and second attachment means.

The various aspects of the present invention will be more fully understood when the following portions of the specification are read in conjunction with the accompanying drawings wherein:

BRIEF DESCRIPTION OF THE DRAWINGS

FIG. 1 is a fragmentary cross sectional view of the improved tension-compression liquid spring unit of the present invention;

FIG. 2 is a cross sectional view taken substantially along line 2—2 of FIG. 1, with the end of the liquid spring being shown in elevation;

FIG. 3 is a cross sectional view taken substantially along line 3—3 of FIG. 1;

FIG. 10 is a cross sectional view of a modified tension-compression liquid spring unit in a neutral position;

FIG. 11 is a view similar to FIG. 10 showing the unit when compression forces are applied thereto; and FIG. 12 is a view of the unit of FIG. 10 with tension forces applied thereto.

DESCRIPTION OF THE PREFERRED EMBODIMENTS

Figure 4:
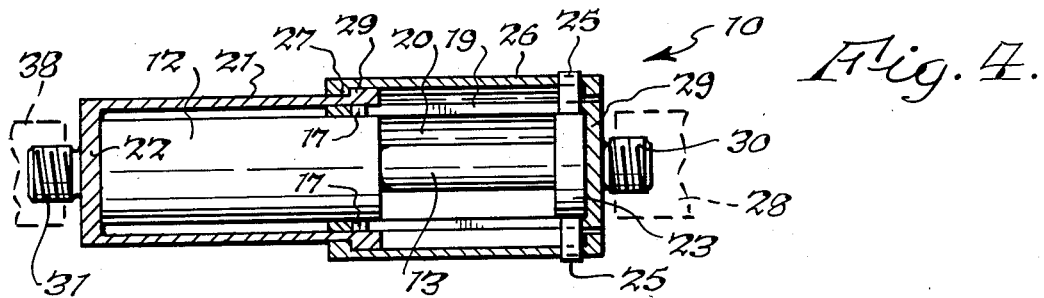
FIG. 4 is a cross sectional schematic view of the unit of FIG. 1 in a neutral position.

The tension-compression liquid spring unit 10 includes a liquid spring 11 including a cylinder 12 which receives a piston 13 and contains a compressible liquid 14, such as a silicone liquid, in chamber 15. The unit 10 is operable to provide a hydraulic spring action in both tension and compression by virtue of the manner in which the liquid spring 11 is mechanically mounted on the remainder of the unit. A seal 16 seals the compressible liquid 14 from leakage between seal 16 and cylinder 12 and between seal 16 and piston 13. Seal 16 includes an annular lip 17' which receives piston 13, and an annular chamber 19 surrounds lip 17' so that pressurized liquid in chamber 19 will enhance the sealing relationship. The foregoing sealing arrangement is well known in the art and does not form a novel part of the present subject matter.

An annular metallic cap 18 fits into tapped portion 21' of the cylinder to move seal 16 to its desired position and while doing so effects compression of the compressible liquid 14 to approximately 3% or roughly about 6,000 psi internal pressure. A threaded collar 22' is also received in tapped portion 21' to hold cap 18 in position. Piston 13 mounts a shock absorber head 23' which modulates flow of liquid on opposite sides thereof to accomplish dampening. A fast return valve 25' is mounted for slidable axial movement relative to shock absorber head 23' to close off ports 24' when piston 13 moves to the left and which returns to the open position shown in the drawing as a result of the action of the flow of liquid to permit a fast return of piston 13 to the position in which it will move as the liquid 14 expands.

The hydraulic spring unit 10 of the present invention is capable of operating in an extremely limited space because of the specific construction wherein there is a telescopic mounting for cylinder 12 and a telescopic arrangement associated with piston 13. In this respect, cylinder 12 includes a diametrically opposed pair of bosses 17 at its end closest to piston 13. Bosses 17 are received in slots 19 of sleeve 20 so that when compressive forces are applied to the unit, as shown in FIG. 5, bosses 17 can slide in slots 19 during the telescoping of sleeve 20 onto cylinder 12. A second sleeve 21 telescopically receives sleeve 20 and sleeve 21 includes an end wall 22 against which cylinder 12 abuts when the unit 10 is in the neutral position of FIG. 4 or the position shown in FIG. 5 wherein compressive forces are applied thereto.

Piston 13 is affixed to disc 23 by a threaded connection at 24 and disc 23 includes a pair of pintles 25 at diametrically opposite portions thereof, and these pintles are fixedly secured to sleeve 26, which rides on sleeve 21 under certain conditions. An annular shoulder 27 on sleeve 26 is in abutting engagement with an annular shoulder 29 on sleeve 21 when unit 10 is in the neutral position shown in FIG. 4 or when tension forces are applied thereto as shown in FIG. 6. However, when compressive forces are applied to unit 10, shoulders 27 and 29 will separate, as the housing consisting of sleeves 21 and 26 collapses or telescopes, and sleeve 26 will ride on sleeve 21 to the position shown in FIG. 5.

Figure 5:
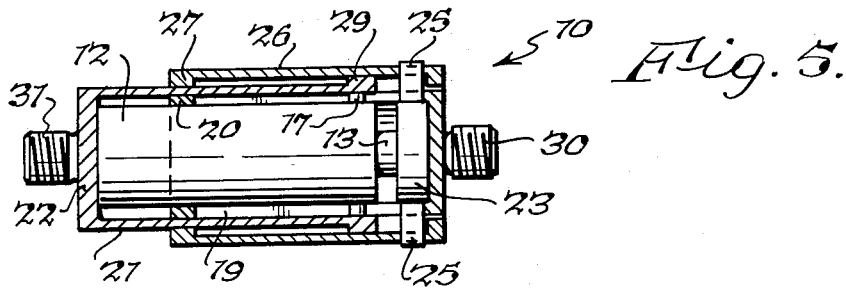
FIG. 5 is a view similar to FIG. 4 but showing the unit when compression forces are applied thereto.
Figure 6:
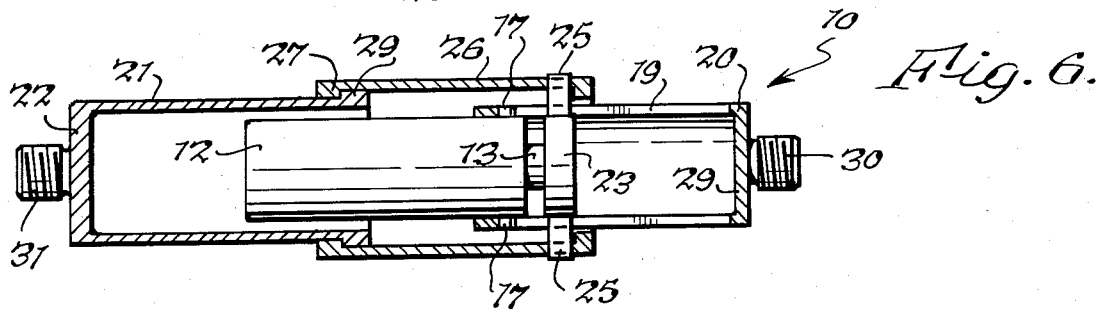
FIG. 6 is a view similar to FIG. 4 but showing the unit when tension forces are applied thereto.

As noted previously, there is a telescopic relationship between piston 13 and sleeve 21, as can be seen from FIG. 5 wherein piston 13 has entered into sleeve 21 from the position shown in FIG. 4. This is possible because slots 19 will move along bosses 17 during the time that compressive forces are applied to unit 10 so as to permit piston 13 to telescope relative to sleeve 21.

The action which permits the unit 10 of FIGS. 1-6 to be made relatively short is the arrangement wherein cylinder 12 and piston 13 can telescope toward each other from each end of unit 10 when compressive forces are applied thereto, and this is permitted because sleeves 21 and 26, which constitutes a collapsible housing, can telescope with respect to each other, as will become more apparent hereafter.

At this point it is to be noted that sleeve 26 has an end wall 29 to which a threaded attachment boss 30 is rigidly affixed, and that end wall 22 of sleeve 21 has a threaded attachment boss 31 rigidly affixed thereto. The external forces are applied to these attachment bosses from external members 28 and 38 so as to enable unit 10 to be subjected to tension or compression forces applied by such external members. When unit 10 is in a neutral position, the parts will assume the position shown in FIG. 4. When compression forces are applied to unit 10, it will assume the position shown in FIG. 5 wherein piston 13 will be forced into cylinder 12 and sleeve 20 will telescope over cylinder 12 and in turn will be telescopically received in sleeve 21 which in turn is telescopically received in sleeve 26. Housing sleeves 21 and 26 can telescope relative to each other because enlarged annular member 27 at the end of sleeve 26 can slide along the surface of sleeve 21. Disc 23, which is attached to piston 13, will move with piston 13 and end wall 22 of sleeve 21 will hold cylinder 12 against movement as piston 13 is moved into it. It is the above described telescoping relationship between the various parts which permits the unit 10 to be relatively short.

When tension forces are applied to bosses 30 and 31 by external members 28 and 38, unit 10 will assume the position shown in FIG. 6 wherein cylinder 12 is pulled out of sleeve 21 by virtue of the connection between bosses 17 and sleeve 20 at the ends of slots 19. However, disc 23 will be held in position in sleeve 26 by pintles 25, and since shoulders 27 and 29 are locked, the housing comprising sleeves 21 and 26 will not be able to expand and piston 13 will be held against movement while cylinder 12 is pulled onto it as it is moved to the right with sleeve 20.

Figure 7:
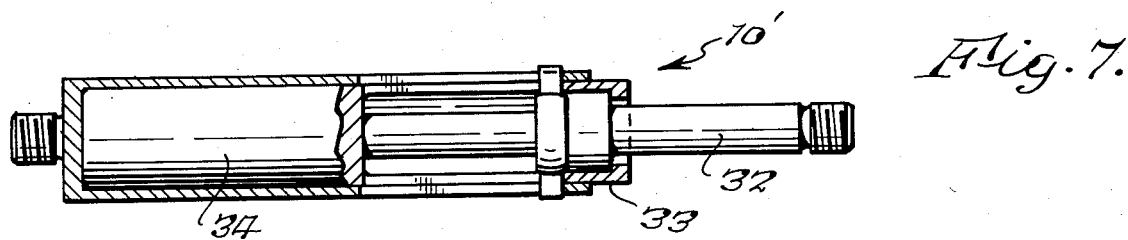
FIG. 7 is a cross sectional schematic view of a similar type of tension-compression liquid spring unit which is in a neutral position and which is longer than the unit of FIGS. 1–6 because of its different structure.

FIGS. 4 and 7 compare the lengths of two types of tension-compression liquid spring units 10 and 10' in their neutral positions. It can readily be seen that unit 10' is longer than unit 10 because of the fact that elongated member 32 extends outwardly a longer distance than boss 30. The construction of unit 12' is described in my copending application Ser. No. 250,845, filed of even date herewith. The elongated member 32 is necessary during the time that compressive forces are applied to unit 10', as can be visualized from FIG. 8 when member 32 is moved into extension 33 of cylinder 34. It will readily be appreciated that since sleeve 20 of FIG. 4 can telescope onto cylinder 12 and since sleeves 21 and 26 can telescope, unit 10 can be shorter than unit 10' which has no way of collapsing the structure which supports liquid spring 11. FIG. 9 shows unit 10' when tension forces are applied thereto, and the operation of unit 10' is fully described in the above mentioned copending application. Insofar as pertinent here, it can be seen that unit 10 in its neutral position in FIG. 4 is shorter than unit 10' in its neutral position in FIG. 7; that unit 10 in FIG. 5 is shorter than unit 10' in FIG. 8 when both are subjected to the maximum amount of compression; and that unit 10 in FIG. 6 is shorter than unit 10' in FIG. 9 when both are subjected to the maximum amount of tension. In other words, unit 10 can occupy a much smaller space than unit 10' under all corresponding conditions of operation.

In FIGS. 10-12 a modified form of the embodiment of FIGS. 1-6 is disclosed. In this embodiment a tension-compression liquid spring unit 40 includes a liquid spring 41 having a cylinder 42 with a chamber 43 containing a compressible liquid 44. A piston 45 extends through end cap 46 which contains a liquid seal 47. A collapsible housing 49 is provided consisting of sleeve member 50 which is mounted in telescoping relationship with respect to sleeve member 51. First attachment means 52 are attached to sleeve 50 for attachment to a first external member and second attachment means 53 are attached to sleeve 51 for attachment to a second external member.

The inside of piston 45 is formed into a sleeve-like member 54 which slidably receives the enlarged head 55 of rod 56, the opposite end of which is threadably affixed at 57 to the attachment means 53 on sleeve 51. The combination of sleeve 54 and enlarged head 55 are essentially equivalent to sleeve 20 which slides on cylinder 12 A snap ring 57, which is received in a groove 59 on cylinder 42, acts as a stop with shoulder 60 of enlarged portion 61 of sleeve 50 to prevent sleeve 50 from moving to the left beyond a predetermined distance on cylinder 42 when the unit is in a neutral position and when tension forces are applied thereto. In the neutral position shown in FIG. 10, the end 62 of piston 45 is adjacent attachment member 52.

When the unit 40 is placed under compressive loading, as shown in FIG. 11, sleeve 51 will telescope onto sleeve 50 and rod 56 will telescope into sleeve 54 in piston 45 as piston 45 moves into cylinder 42. The foregoing position can be assumed because sleeve 50 contains a cutaway portion 63 which permits cylinder 50 to slide relative to snap ring 57 from the position shown in FIG. 10 to the position shown in FIG. 11.

When the unit is moved from its neutral position shown in FIG. 10 by tension forces, it will move toward the position shown in FIG. 12 wherein sleeve 51 has less overlap with sleeve 50. Snap ring 57 will retain sleeve 50 and cylinder 42 in the same relative positions as in FIG. 10. However, enlarged head 55 will abut shoulder 65 at the end of sleeve 54 to pull piston 45 to the right because of the connection between enlarged head 55 and attachment member 53 through rod 56. When the tension forces are released, the expansion of the compressible liquid 44 will cause the various parts to return to the position shown in FIG. 10.

Figure 8:
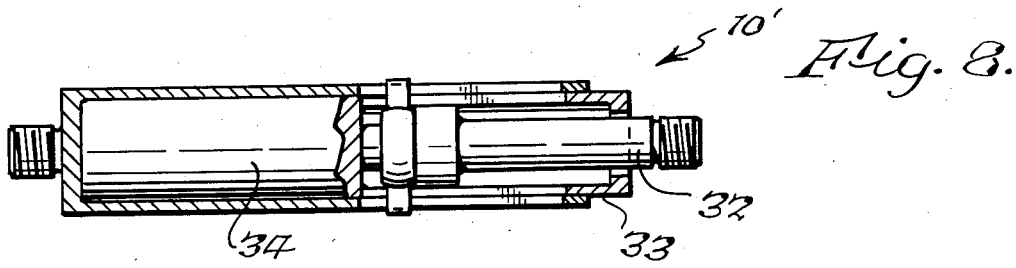
FIG. 8 is a view similar to FIG. 7 but showing the unit of FIG. 7 when compression forces are applied thereto.
Figure 9:
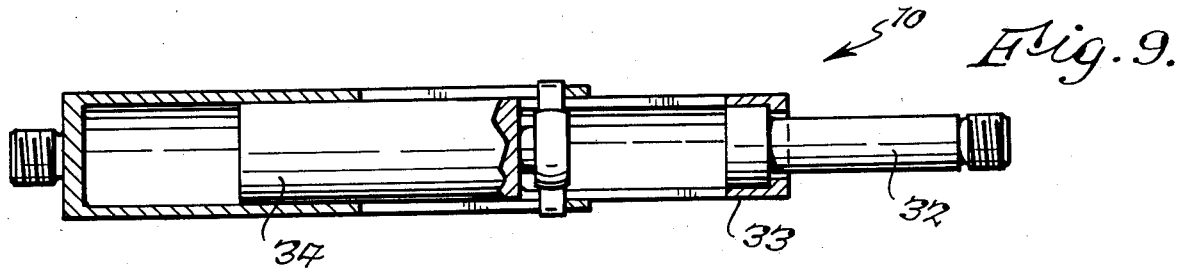
FIG. 9 is a view similar to FIG. 7 but showing the unit when tension forces are applied thereto.

It can thus be seen that the telescoping relationship between sleeve 54 and rod 56 and the telescoping relationship between housing sleeves 50 and 51 permits the unit of FIGS. 10-12 to be made shorter than the unit shown in FIGS. 7–9. It is to be especially noted that the units of FIGS. 1–6 and 10–12 are only slightly longer than the combinations of the length of the cylinder plus the length of the piston travel therein.

It can thus be seen that the various embodiments of the present invention are manifestly capable of achieving the above enumerated objects and while preferred embodiments of the present invention have been disclosed, it will be appreciated that the present invention is not limited thereto but may be otherwise embodied within the scope of the following claims.

What is claimed is:

1. A liquid spring unit operable in both tension and compression comprising: a liquid spring including a cylinder, piston, compressible liquid in said cylinder and a liquid seal for said piston; sleeve means for telescopic mounting relative to said cylinder; a collapsible housing for mounting about said cylinder; first attachment means mounted relative to said sleeve means for attachment to a first external member; second attachment means on said housing for attachment to a second external member; means for permitting said housing to collapse when compression forces are applied to said first and second attachment means; means for preventing said housing from extending beyond a predetermined length when tension forces are applied to said first and second attachment means: and coupling means extending between said liquid spring and said collapsible housing for driving said piston into said cylinder when both compression and tension forces are applied to said unit.

2. A liquid spring unit operable in both tension and compression as set forth in claim 1 wherein said collapsible housing comprises second and third telescoping sleeve means.

3. A liquid spring unit operable in both tension and compression as set forth in claim 2 wherein said sleeve means comprises a hollow portion of said piston.

4. A liquid spring unit operable in both tension and compression as set forth in claim 3 wherein said coupling means operable during the application of tension forces include a rod; an enlarged head on said rod for movement in said hollow portion of said piston; and a shoulder in said piston for engagement by said enlarged head when tension forces are applied to said first and second attachment means.

5. A liquid spring unit operable in both tension and compression as set forth in claim 4 wherein said coupling means operable during the application of compression forces include an abutment surface on said second sleeve means for bearing against said piston.

6. A liquid spring unit operable both tension and compression as set forth in claim 4 wherein said second sleeve means is slidable on said cylinder; and wherein said third sleeve means is slidable on said second sleeve means; and stop means between said cylinder and said second sleeve means for limiting movement therebetween when tension forces are applied to said first and second attachment means.

7. A liquid spring unit operable in both tension and compression as set forth in claim 2 wherein said sleeve means includes a plurality of slots, and wherein said coupling means comprises a coupling member mounted within said sleeve means and includes pintles extending through said slots, and wherein said third sleeve means is mounted on said second sleeve means, and wherein said pintles are attached to said third sleeve means.

8. A liquid spring unit operable in both tension and compression as set forth in claim 7 wherein said first attachment means are mounted on said sleeve means, and wherein said second attachment means are mounted on said second sleeve means, first shoulder means on said second sleeve means located in spaced relationship to said second attachment means, and second shoulder means on said third sleeve means mounted in spaced relationship to said coupling member for selective engagement with said first shoulder means except when said unit is subjected to compressive forces.

9. A liquid spring unit operable in both tension and compression as set forth in claim 8 wherein said piston is mounted on said coupling member and wherein said cylinder is located within said second sleeve means.

10. A liquid spring unit operable in both tension and compression as set forth in claim 8 including first ends at the ends of said slots at a first distance from said second attachment means, second ends at the ends of said slots at a second distance from said second attachment means which is greater than said first distance, said pintles engaging said second ends of said slots when compression forces are applied to said unit and when neither tension or compression forces are applied to said unit, and said pintles being located in a position away from said second ends of said slots and closer to said first ends of said slots when tension forces are applied to said unit.

11. A liquid spring unit operable in both tension and compression as set forth in claim 10 wherein said piston is mounted on said coupling member and wherein said cylinder is located within said second sleeve means.

12. A liquid spring unit operable in both tension and compression as set forth in claim 10 wherein said third sleeve means includes a first end proximate said second shoulder means and a second end remote from said second shoulder means, and an opening in said second end of said third sleeve means for permitting said sleeve to pass therethrough.

13. A liquid spring unit operable in both tension and compression as set forth in claim 2 wherein said sleeve means comprises a sleeve slidable on said cylinder.

14. A liquid spring unit operable in both tension and compression as set forth in claim 13 wherein said second sleeve means is slidable on said sleeve; and said third sleeve means is slidable on said second sleeve means.

15. A liquid spring unit operable in both tension and compression as set forth in claim 14 including stop means between said second and third sleeve means for limiting movement therebetween when tension forces are applied to said first and second attachment means.

16. A liquid spring unit operable in both tension and compression as set forth in claim 15 wherein said coupling means comprise a member fixedly connected to said third sleeve means for effectively bearing on the end of said piston.

* * * * *